US011943833B2

(12) United States Patent
Ljung (10) Patent No.: US 11,943,833 B2
(45) Date of Patent: Mar. 26, 2024

(54) METHOD FOR DISCOVERY SIGNALLING, RELATED NETWORK NODE AND RELATED WIRELESS ELECTRONIC DEVICE

(71) Applicant: Sony Group Corporation, Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 101 days.

(21) Appl. No.: 17/276,136

(22) PCT Filed: Aug. 27, 2019

(86) PCT No.: PCT/SE2019/050790
§ 371 (c)(1),
(2) Date: Mar. 13, 2021

(87) PCT Pub. No.: WO2020/067949
PCT Pub. Date: Apr. 2, 2020

(65) Prior Publication Data
US 2022/0046404 A1    Feb. 10, 2022

(30) Foreign Application Priority Data

Sep. 28, 2018 (SE) .................................. 1851164-2

(51) Int. Cl.
*H04W 4/00* (2018.01)
*H04L 1/00* (2006.01)
(Continued)

(52) U.S. Cl.
CPC ........... *H04W 8/005* (2013.01); *H04L 1/0004* (2013.01); *H04W 52/0229* (2013.01)

(58) Field of Classification Search
CPC . H04W 8/005; H04W 52/0229; H04W 52/02; H04W 8/00; H04L 1/0004; H04L 1/00
(Continued)

(56) References Cited

U.S. PATENT DOCUMENTS 9,647,864 B2 * 5/2017 Nory .................... H04L 27/2613
10,250,420 B2 * 4/2019 Nory ..................... H04W 24/08
(Continued)

FOREIGN PATENT DOCUMENTS

CN    106576030 A    4/2017
EP     3340706 A1    6/2018
(Continued)

OTHER PUBLICATIONS

International Search Report and Written Opinion from corresponding International Application No. PCT/SE2019/050790, dated Nov. 20, 2019, 15 pages.
(Continued)

*Primary Examiner* — Marceau Milord
(74) *Attorney, Agent, or Firm* — Tucker Ellis LLP (57) ABSTRACT

A method for discovery signally is disclosed. The method, performed at a network node of a wireless communications network, comprises generating an indicator based on one or more control information to be transmitted in a control signal for discovery, and transmitting the indicator as a preamble to the control signal, wherein the indicator is indicative of content of the control signal.

19 Claims, 5 Drawing Sheets

(51) Int. Cl.
*H04W 8/00* (2009.01)
*H04W 52/02* (2009.01)

(58) Field of Classification Search
USPC .......................................................... 370/329
See application file for complete search history.

(56) References Cited

U.S. PATENT DOCUMENTS

| | | | |
|---|---|---|---|
| 10,498,593 B2* | 12/2019 | Yoo | H04L 5/006 |
| 10,687,324 B2* | 6/2020 | Behravan | H04L 5/00 |
| 10,863,420 B2* | 12/2020 | Baldemair | H04L 5/0048 |
| 10,912,129 B2* | 2/2021 | Zhang | H04W 72/1263 |
| 11,064,424 B2* | 7/2021 | Zhang | H04L 27/26 |
| 11,224,031 B2* | 1/2022 | Zhang | H04L 1/0003 |
| 11,304,190 B2* | 4/2022 | Yang | H04W 16/10 |
| 2013/0171999 A1 | 7/2013 | Katar et al. | |
| 2014/0056220 A1* | 2/2014 | Poitau | H04W 76/14 |
| | | | 370/328 |
| 2016/0301555 A1* | 10/2016 | Nory | H04L 5/001 |
| 2016/0301556 A1* | 10/2016 | Nory | H04L 27/2647 |
| 2016/0302180 A1* | 10/2016 | Nory | H04W 72/044 |
| 2017/0222857 A1* | 8/2017 | Nory | H04L 27/2613 |
| 2018/0054342 A1* | 2/2018 | Nory | H04L 27/2613 |
| 2018/0206192 A1 | 7/2018 | Vermani et al. | |
| 2019/0037481 A1* | 1/2019 | Zhang | H04L 5/0032 |
| 2019/0174440 A1 | 6/2019 | Kwak | |
| 2019/0182085 A1* | 6/2019 | Nory | H04L 5/0048 |
| 2019/0246410 A1* | 8/2019 | Zhang | H04L 5/0053 |
| 2019/0253955 A1 | 8/2019 | Abedini | |
| 2020/0305198 A1* | 9/2020 | Li | H04W 72/23 |
| 2021/0185737 A1* | 6/2021 | Zhang | H04W 28/18 |

FOREIGN PATENT DOCUMENTS

| | | | |
|---|---|---|---|
| JP | 2017532897 A | 11/2017 | |
| KR | 20140116169 A | 10/2014 | |
| KR | 20150110616 A | 10/2015 | |
| KR | 20170128427 A | 11/2017 | |
| WO | 2014113537 A1 | 7/2014 | |
| WO | WO-2015014395 A1 * | 2/2015 | ........... H04B 17/318 |
| WO | WO-2015171039 A1 | 11/2015 | |
| WO | 2016164141 A1 | 10/2016 | |
| WO | WO-2017162813 A1 | 9/2017 | |
| WO | WO-2018030783 A1 | 2/2018 | |
| WO | 2018175760 A1 | 9/2018 | |

OTHER PUBLICATIONS

Swedish Office Action with Swedish Search Report from corresponding Swedish Application No. 1851164-2, dated May 3, 2019, 8 pages.

* cited by examiner

METHOD FOR DISCOVERY SIGNALLING, RELATED NETWORK NODE AND RELATED WIRELESS ELECTRONIC DEVICE

The present disclosure pertains to the field of wireless communications. More specifically the present disclosure relates to a method, performed at a network node of a wireless communications network, for discovery signalling, and a related network node, as well as a method, performed at a wireless electronic device, for discovery signalling in a wireless communications network and a related wireless electronic device.

BACKGROUND

In wireless communications systems, such as Third Generation Partnership Project, 3GPP, systems with operations in the unlicensed band, control information needs to be communicated from the network node to the wireless electronic device or user equipment.

In 3GPP systems, several different types of physical layer signaling, including specific control signals for different purposes are specified in TS 38.211, V15.2.0, Release 15. The number control signals appear to be increasing in the latest developments e.g. to address coexistence issues, synchronization, cell acquisition, channel measurements, and various system information.

3GPP further studies how the 5G Radio Access Technology, New Radio, NR, can operate in unlicensed bands, NR-U and how control signals may be supported in NR-U.

SUMMARY

There is a need for optimizing the transmission of control information between the network node and the wireless electronic device.

Accordingly, there is a need for methods for discovery signalling and related network nodes which enhances control signals for discovery in 3GPP systems with operations in the unlicensed band.

A method for discovery signalling is disclosed. The method, performed at a network node of a wireless communications network, comprises generating an indicator based on one or more control information to be transmitted in a control signal for the discovery signalling, and transmitting the indicator as a preamble to the control signal for discovery in a transmission occasion, wherein the indicator is indicative of the content of the control signal.

Further, a network node is provided, the network node comprising a memory module, a processor module, and a wireless interface, wherein the network node is configured to perform a method disclosed herein.

It is an advantage of the present disclosure that the transmission of control information between the network node and the wireless electronic device is optimized by generating an indicator based on the control information type to be included as content of the control signal for discovery and by including the indicator in the transmission occasion of the control signal. For example, the indicator can be transmitted as a preamble initiating the transmission of the control signal. This may allow a selective inclusion of relevant control information type as content of the control signal and an indication of the selection by transmitting the indicator in the same transmission occasion as the control signal.

Further, a method performed in the wireless electronic device is disclosed. The method is performed for discovery signaling in a wireless communications network. The method comprises receiving a preamble to a control signal for discovery, wherein the preamble comprises an indicator indicative of content of the control signal. The method comprises determining, based on the indicator, the content of the control signal. The method comprises receiving the control signal in the same transmission occasion as the preamble.

The present disclosure relates to a wireless electronic device comprising a memory module, a processor module, and a wireless interface, wherein the wireless electronic device is configured to perform a method disclosed herein.

It is an advantage of the present disclosure that selective decoding of the control signal may be performed at the wireless electronic device based on the indicator, which may advantageously act as a wake up signal, an indicator of content and/or length of the control signal, and/or an indication of usage of the unlicensed band. This may result in an increased battery life for the wireless electronic device

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In 3GPP New Radio, NR, with potential future Releases enabling operations in an unlicensed band (also entitled NR-U), it is beneficial to have a control signal for discovery (e.g. a discovery reference signal, DRS) that may include several types of control information, and one or more combined sets of control information. Transmissions on unlicensed bands require a clear channel access procedure to be performed prior to the transmission, in order to provide fair coexistence between wireless electronic devices attempting to utilize the unlicensed band. A benefit of potentially defining a discovery reference signal as a combination of multiple control signals is the possibility to combine transmissions of several types of control information into transmission occasions. If one transmission occasion comprises two or more types of control information, that otherwise would be transmitted individually, the number of clear channel access attempts needed for the transmission of the control information can be reduced. This enables a more efficient control channel transmission with fewer CCA attempts required by the system. The disclosed combined signal based on types of control information included into a transmission occasion may be denoted a discovery signal, or a discovery reference signal. Hence the transmission of the discovery signal may be a series of transmissions of multiple individual signals, where the transmission of the multiple individual signals occurs in a single transmission occasion.

The control information may include for example cell acquisition information, synchronization information (e.g. a primary synchronization signal, PSS, and/or a secondary synchronization signal, SSS), one or more broadcast signals (e.g. a Cell-Specific reference signal on a Physical Broadcast Shared Channel, PBSCH, a Channel State Information, CSI reference signal), on-demand system information, and/or paging information.

In 3GPP systems with operations in the unlicensed band, several different types of signaling, including specific control signals for different purposes are planned for the specification. The number of control signals appear to be increasing in the latest developments.

The inventors have found that as the different types of control information to include in the control signal for discovery (e.g. the discovery signal or the discovery reference signal) increases, the more control information would need to be decoded by each wireless electronic device listening for the control signal for discovery, causing additional energy consumption for wireless electronic devices listening for control signal for discovery. And, it may be envisaged that the wireless electronic device may unnecessarily decode control information that is not needed and thereby unnecessarily use spectrum resources and power consumption. In other words, not all the wireless electronic devices listening to the channel may find that the control information included in the same control signal for discovery is relevant.

The present disclosure proposes to optimize the transmission of control information between the network node and the wireless electronic device by generating an indicator based on the control information type to be included as content of the control signal for discovery and by including the indicator in the control signal. This may allow a selective inclusion of relevant control information type as content of the control signal and an indication of the selection by including the indicator in the control signal. This may lead to performing selective decoding at the wireless electronic device based on the indicator.

Further, since the transmissions on an unlicensed band typically requires a clear channel access, CCA, procedure to be performed prior to the actual transmission, there may be an uncertainty in when (in time) the CCA procedure is finalized and hence when (in time) the transmission of the control signalling for discovery occurs. With the use of the disclosed indicator as a preamble to the control signal, a wireless electronic device attempting to receive the control signal may use the preamble as an indicator of the upcoming control information, which may lead to a more power efficient detection in the wireless electronic device.

As discussed in detail herein, the present disclosure relates to a wireless communications network comprising a cellular network operating on an unlicensed band. The network node refers to a wireless node operating in the network, such as a base station, an evolved Node B, eNBs, a global Node B, gNBs. The wireless communications network described herein may comprise one or more wireless electronic devices, and one or more network nodes, such as one or more of: a base station, an eNB, a global Node B and/or an access point.

A wireless electronic device may refer to as a mobile device and/or a user equipment, UE.

The figures are schematic and simplified for clarity, and they merely show details that are helpful in providing an understanding of the example embodiments, while other details have been left out. Throughout, the same reference numerals are used for identical or corresponding parts.

Figure 1:
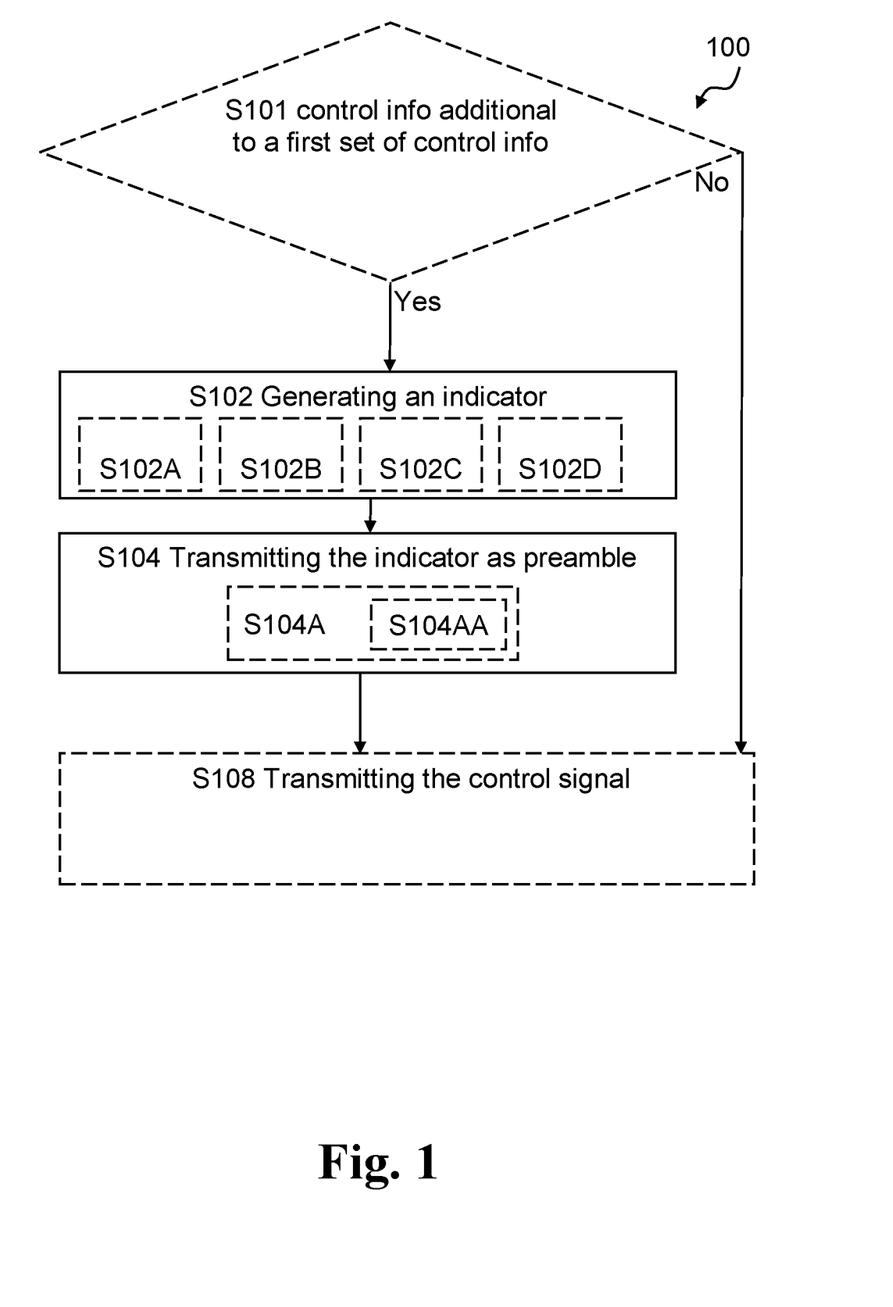
FIG. 1 is a flow diagram of an exemplary method, performed in a network node according to the disclosure, FIG. 2 schematically illustrates an exemplary network node according to the disclosure, FIG. 3 schematically illustrates transmissions of a plurality on control signals for discovery by an exemplary network node according to the disclosure.

FIG. 1 is a flow diagram of an exemplary method 100 according to the disclosure. The method 100 is performed at a network node of a wireless communications network, for discovery signalling. The method 100 comprises generating S102 an indicator based on one or more control information to be transmitted in a control signal for discovery (e.g. a discovery reference signal). In other words, generating S102 the indicator may comprise selecting the indicator based on the one or more control information to be transmitted in the control signal for discovery. The indicator may be seen as an indicator of control signal type. Stated differently, generating S102 the indicator may comprise generating the indicator depending on what control information is to be transmitted in the control signal. In one or more exemplary methods, generating S102 the indicator may comprise generating the indicator depending on what type of control information is to be transmitted in the control signal. In other words, different indicators can be generated depending on what type of control information is to be transmitted in the control signal. In one or more exemplary methods, generating S102 the indicator may comprise generating the indicator depending on whether a type of control information (e.g. control information type) is to be transmitted in the control signal or not. In other words, the indicator may be generated and transmitted in case a specific type of control information is to be transmitted. In one or more exemplary methods, generating S102 the indicator may comprise determining one or more control information type is to be included in the control signal, and generating the indicator based on the determining.

Control information as disclosed herein may refer to information or data related to signalling or part of a control plane. The control information may refer to control information for discovery. For example, the control information comprises one or more of: cell acquisition information including synchronization information (e.g. a primary synchronization signal, PSS, and/or a secondary synchronization signal, SSS), one or more broadcast signals (e.g. a reference signal such as Cell-Specific reference signal on a Physical Broadcast Shared Channel, PBSCH, a Channel State Information, CSI reference signal), basic system information, additional system information, on-demand system information, paging information, occupied bandwidth information, remaining system information, automatic neighbour relations information, and channel occupancy time information.

In one or more exemplary methods, generating S102 an indicator based on one or more control information comprises identifying S102B one or more control information types based on the control information to be transmitted in the control signal for discovery, and generating S102C the indicator based on the one or more control information types. This allows for example to generate an indicator when e.g. paging information type is to be transmitted in the control signal for discovery. A control signal for discovery (e.g. a discovery signal or a discovery reference signal) may refer to a signal transmitted by a network node for the purpose of other devices to perform discovery signalling, such as one or more of system detection, cell identification, time synchronization, frequency synchronization, antenna configuration or calibration, receiving paging indication, receiving system information or similar. The discovery signalling may be performed by transmitting one or more control information types. A control information type as disclosed herein may refer to a type of control information amongst the plurality of types of control information involved in discovery signalling. The control information type corresponds to a control information to be included as content in the control signal. For example, the control information type comprises a cell acquisition information type, a synchronization information type (e.g. corresponding to the following control information to be transmitted in the control signal: a primary synchronization signal, PSS, and/or a secondary synchronization signal, SSS), broadcast information type (e.g. corresponding to the following control information to be transmitted: a reference signal type, e.g. Cell-Specific reference signal on a Physical Broadcast Shared Channel, PBSCH), a Channel State Information, CSI, type (e.g. corresponding to the following control information to be transmitted: a CSI reference signal or a CSI pilot), a basic system information type corresponding to basic system information to be transmitted, an additional system information type corresponding to additional system information to be transmitted, an on-demand system information type corresponding to on-demand system information to be transmitted, paging information type corresponding to paging information to be transmitted, occupied bandwidth information type corresponding to occupied bandwidth information to be transmitted, remaining system information type corresponding to remaining system information to be transmitted, automatic neighbour relations information type corresponding to automatic neighbour relations information to be transmitted, and channel occupancy time information type corresponding to channel occupancy time information to be transmitted.

The method 100 comprises transmitting S104 the indicator as a preamble to the control signal for discovery in a transmission occasion. The indicator is indicative of the content of the control signal. In other words, the indicator is indicative of the control information to be transmitted in the control signal. The content of the control signal may comprise control information carried by the control signal. The content of the control signal may comprise control information corresponding to the one or more control information to be transmitted in the control signal and thereby indicated by the indicator generated.

It may be appreciated that the disclosed preamble may be transmitted prior to an NR-U transmission which is beneficial for indication on whether a type of control information (e.g. stated differently: a certain type of control information) is included in the NR-U signal transmission. For example, the disclosed indicator transmitted as a preamble may be advantageously used as a wake up signal prior to a synchronization signal burst or a more general discovery reference signal transmission, e.g. to indicate that the DRS includes a specific signal or control element. For example, the disclosed preamble or disclosed indicator indicates which type of signal(s) is included in the NR-U signal transmission.

In one or more exemplary methods, the indicator is used to detect a DL transmission burst. For example, the indicator transmitted as a preamble is beneficial for detection of DL transmission burst and results in a reduction of the power consumption caused by frequent PDCCH monitoring at the wireless electronic device In one or more exemplary methods, generating the indicator may be performed based on PSS and/or SSS to be transmitted.

In one or more exemplary methods, the control information comprises a cell identity, cell ID, and/or a parameter associated with a beam/transmission point. In one or more exemplary methods, the control signal for discovery comprises one or more individual signals. The content of the control signal may include one or more separate or individual signals corresponding to the one or more control information as specified by a wireless communication standard combined into a transmission occasion, such as a single transmission occasion. Further the content of the control signal may include one or more control information types, e.g. carried in one or more individual signals.

In one or more exemplary methods, the indicator is indicative of the length of the control signal.

In one or more exemplary methods, the control signal for discovery comprises a discovery reference signal. In one or more exemplary methods, the discovery reference signal comprises one or more of: a reference signal to be sent in an unlicensed band. A reference signal, RS, refers to a signal that supports channel signalling, such as uplink, UL, channel signalling, such as downlink, DL, channel signalling, such as channel acquisition, such as scheduling. The control signal refers to a control signal that is configured to provide control information to the wireless electronic device in e.g. NR-U. Depending on the control information type, the control signal may include one or more of the following control information: cell acquisition information including synchronization information (e.g. a primary synchronization signal, PSS, and/or a secondary synchronization signal, SSS), one or more broadcast signals (e.g. a reference signal such as Cell-Specific reference signal on a Physical Broadcast Shared Channel, PBSCH, a Channel State Information, CSI reference signal), basic system information, additional system information, on-demand system information, paging information, occupied bandwidth information, remaining system information, automatic neighbour relations information, and channel occupancy time information.

For example, paging information is to be included when paging is performed in one or more upcoming time slots at the network node. Cell acquisition information is not required to be transmitted as often as reference signals such as Cell-specific reference signal, CRS. It may be envisaged that cell acquisition information is included in every N transmission occasions of a control signal for discovery in order to save signaling resources (where N is an integer, e.g. an integer between 2 and 4). For example, identifying S102B the one or more control information types based on control information to be transmitted in the control signal for discovery may be performed based on the periodicity and/or request of a specific control information to be sent in the control signal.

In one or more exemplary methods, generating S102 the indicator based on the one or more control information types comprises selecting S102D the indicator, amongst a plurality of indicators, based on the one or more control information types. Stated differently, each indicator of the plurality of indicators is mapped to one or more control information types to be transmitted in the control signal, e.g. to a specific content of the control signal for discovery. Each indicator may be defined in the form of a sequence. In other words, the indicator may be generated using a sequence, such as a base sequence, which in turn can be further spread into a sequence of bits with e.g. a cross correlation performance. The indicator may be seen as a sequence number. An exemplary plurality of indicators may be of the following form e.g.:

TABLE 1

Indicators and corresponding control information types for discovery signalling

| Indicator | Control information types to be included in the control signal as content |
|---|---|
| 0 | Pilot(s) (CSI-RS), basic system information |
| 1 | Pilot(s) (CSI-RS), basic system information, Additional system information |
| 2 | Pilot(s) (CSI-RS), basic system information, on-demand system information |
| 3 | Pilot(s) (CSI-RS), basic system information, paging information |
| 4 | Pilot(s) (CSI-RS), basic system information, on-demand system information, paging information |

In an illustrative example where the disclosed technique is applied, the network node identifies the control information types corresponding to: a Cell-Specific reference signal (e.g. Pilots (CSI-RS)), basic system information, and paging information. In this example, the network node generates an indicator based on a sequence which is indicative of the control information types to be transmitted in the control signal as a discovery reference signal. The sequence generation may be performed by mapping a base sequence to the indicator "3", and may further be performed by spreading the base sequence with a spreading sequence. The sequence generation may be performed in order to facilitate certain detection performance upon the detection to be performed by a receiver e.g. by creating a sequence which has a given cross correlation performance with respect to other sequences generated for other combination of control information types. The network node transmits the indicator as a preamble to the control signal comprising the following control information in the same transmission occasion: a Cell-Specific reference signal (e.g. Pilots (CSI-RS)), the basic system information, and the paging information. In this example, the network node transmits the generated indicator indicative of the indicator "3" as a preamble to the control signal comprising a Cell-Specific reference signal (e.g. Pilots (CSI-RS)), the basic system information, and the paging information.

In one or more exemplary methods, transmitting S104 the indicator as the preamble to the control signal comprises applying S104A a first modulation or coding scheme on the preamble and a second modulation or coding scheme on the control signal, wherein the second modulation or coding scheme is different from the first modulation or coding scheme. Following on the example in the preceding paragraph, the network node applies a first modulation or coding scheme on the preamble which may be a generated bit sequence indicative of the indicator "3" and a second modulation or coding scheme on the control signal which includes the Cell-Specific reference signal (e.g. Pilots (CSI-RS)), the basic system information, and the paging information. It may be appreciated that in one or more exemplary methods, the one or more control signal types comprise individual control signals and/or reference signals which may in turn apply different modulation and coding schemes. This enables the wireless electronic device to perform a selective decoding dependent on the indicator. When none of control information carried by the control signal (in this example: the Cell-Specific reference signal, the basic system information, and the paging information) are of interest to the wireless electronic device, the wireless electronic device identifies the content of the control signal by simply demodulating and decoding the indicator, e.g. the specifically generated detection sequence for the indicator which indicates "3" corresponding to control information deemed irrelevant for the wireless electronic device. This way, power consumption may be saved at the wireless electronic device.

In one or more exemplary methods, applying S104A a first modulation or coding scheme on the preamble and a second modulation or coding scheme on the control signal comprises applying S104C an ON/OFF keying (or other low complexity modulation such as binary phase shift keying) modulation scheme to the preamble. In one or more exemplary methods, the indicator transmission may be encoded by e.g. adding redundancy bits or by applying a channel coding scheme, such as convolutional coding. In one or more exemplary methods, the indicator transmission may be uncoded (e.g. may not be coded). In one or more exemplary methods, an ON/OFF keying modulation scheme may comprise an amplitude shift keying modulation scheme. In other words, the indicator may be generated using ON/OFF keying, and thereby can be demodulated and detected early in a receiver chain of the wireless electronic device. This allows the control signal for discovery to be used as a wake-up signal for wireless electronic devices listening for a specific control information type.

In one or more exemplary methods, the method 100 comprises determining S101 whether the one or more control information to be transmitted in the control signal is to include control information additional to a first set of control information. The first set of control information may be predetermined by a specification of a radio system, e.g. specified by the 3GPP. In other words, the first set of control information may comprise a minimum set of control information and/or a default set of control information. The first set of control information may comprise Pilots (CSI-RS), and basic system information.

In one or more exemplary methods, the method 100 comprises: in accordance with a determination that the one or more control information to be transmitted in the control signal is to include control information additional to the first set of control information, performing the generating S102 and the transmitting S104. In one or more exemplary methods and network nodes, the present disclosure allows generating an indicator that could be applied only to control signals which incorporates control information that is additional to a first set of control information. This allows to save signaling resources in the wireless communications network. Since a UE listening for a certain information element would have no specific use of the most empty configuration and the other networks detecting the usage of the unlicensed band don't need so frequent DRS detections, it could possibly be considered that the benefits of the usage of the sequence is achieved even if the baseline DRS would be undetected by a base sequence detection unit.

The indicator can therefore be used as a wake-up signal for wireless electronic devices listening for a specific type of information only, an indicator of the content and/or indicative of the length of the control signal, an easy-to-detect signal indicative of that new radio, NR, is being using the unlicensed band.

In one or more exemplary methods, the method 100 comprises: in accordance with a determination that the one or more control information to be transmitted in the control signal is not to include control information additional to the first set of control information, forgoing the generating S102 and transmitting S108 the control signal.

In one or more exemplary methods, the method 100 comprises determining whether the one or more control information to be transmitted in the control signal is to include control information different from a second set of control information and in accordance with a determination that the one or more control information to be transmitted in the control signal is to include control information different from the second set of control information, performing the generating S102 and the transmitting S104. The second set of control information may be predetermined by the regulations. For example, the network node may generate the indicator according to step S102 and transmit according to step S104 when the one or more control information to be transmitted in the control signal is to include control information different from the second set of control information (e.g. only when the control signal does not comprise any dedicated and/or UE-specific control information).

In one or more exemplary methods, the method 100 comprises transmitting S108 the control signal to a wireless electronic device by transmitting, in a single transmission occasion, a series of a plurality of individual signals forming the control signal. The control signal transmitted may occupy a different frequency bandwidth depending on the control information included in the control signal and the length of the control signal.

Figure 2:
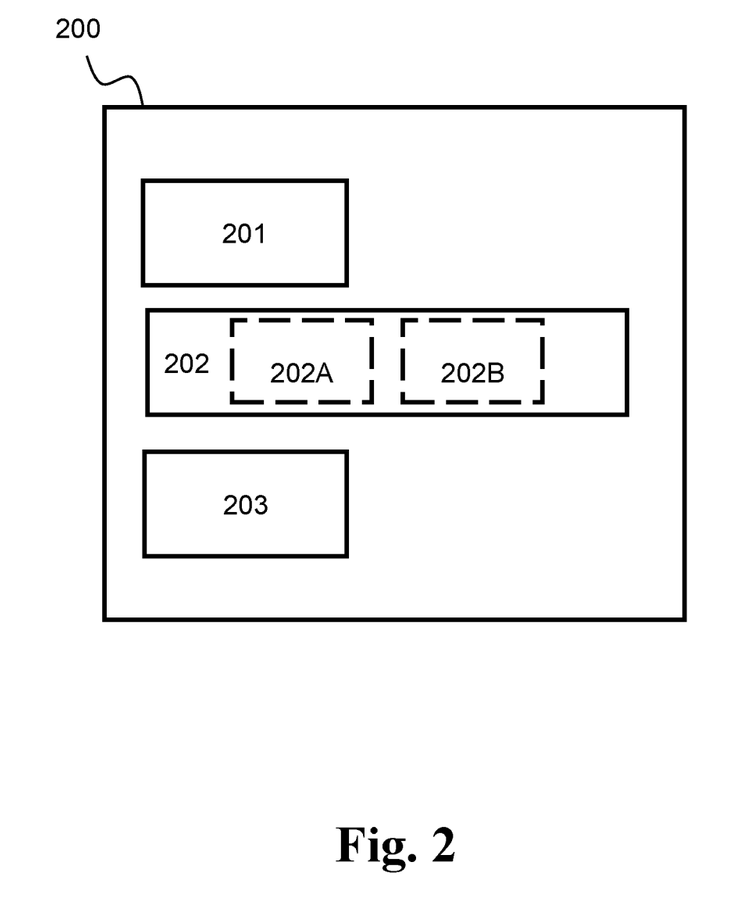

FIG. 2 is a block diagram illustrating an exemplary network node 200 according to this disclosure. The present disclosure relates to a network node 200 of a wireless communication network. Examples of a network node include a base station, an evolved NodeB, and/or an access point.

The network node 200 comprises a memory module 201, a processor module 202, and a wireless interface 203. The network node 200 is configured to perform any of the methods disclosed herein, such as any of the methods shown in FIG. 1.

The processor module 202 is configured to generate, e.g. using an indicator generator module 202A, an indicator based on one or more control information to be transmitted in a control signal for discovery.

The processor module 202 is configured to transmit, e.g. using the wireless interface 203, the indicator as a preamble to the control signal for discovery, wherein the indicator is indicative of the content of the control signal and optionally of a length of the control signal.

The processor module 202 may be configured to perform any of the steps S101, S102A, S102B, S102C, S102D, S104A, S1404AA and S108 (disclosed in FIG. 1).

The wireless interface 203 is configured for wireless communications via a wireless communications network, such as a 3GPP system, such as a 3GPP system with operations in the unlicensed band, such as a 3GGP system with New Radio and unlicensed band operations. The wireless interface 203 may be configured to transmit the indicator as a preamble to the control signal and the control signal to a wireless electronic device (such as a wireless electronic device disclosed herein).

The processor module 202 is optionally configured to perform any of the operations disclosed in FIG. 1. The operations of the network node 200 may be embodied in the form of executable logic routines (e.g., lines of code, software programs, etc.) that are stored on a non-transitory computer readable medium (e.g., the memory module 201) and are executed by the processor module 202).

Furthermore, the operations of the network node 200 may be considered a method that the network node 200 is configured to carry out. Also, while the described functions and operations may be implemented in software, such functionality may as well be carried out via dedicated hardware or firmware, or some combination of hardware, firmware and/or software.

The memory module 201 may be one or more of a buffer, a flash memory, a hard drive, a removable media, a volatile memory, a non-volatile memory, a random access memory (RAM), or other suitable device. In a typical arrangement, the memory module 201 may include a non-volatile memory for long term data storage and a volatile memory that functions as system memory for the processor module 202. The memory module 201 may exchange data with the processor module 202 over a data bus. Control lines and an address bus between the memory module 201 and the processor module 202 also may be present (not shown in FIG. 2). The memory module 201 is considered a non-transitory computer readable medium.

The memory module 201 may be configured to store a look-up table associating an indicator to corresponding control information types in a part of the memory.

Figure 3:
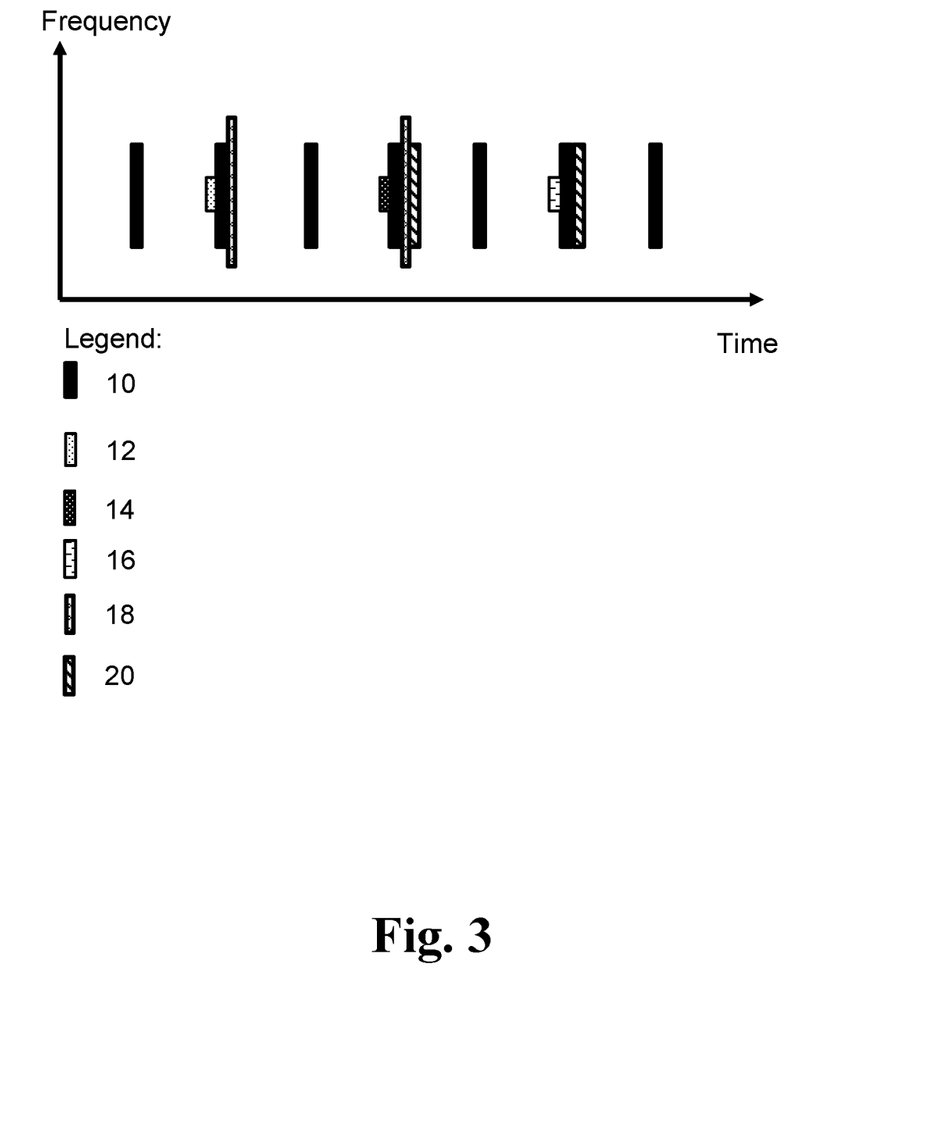

FIG. 3 schematically illustrates transmissions of a plurality on control signals for discovery by an exemplary network node according to the disclosure. In one or more exemplary methods and network nodes, the network node determines whether the one or more control information to be transmitted in the control signal is to include control information additional to a first set of control information, and in accordance with a determination that the one or more control information to be transmitted in the control signal is to include control information additional to a first set of control information, the network node generates the indicator based on control information The first set may be seen as predetermined set, a default set or a minimum set.

In FIG. 3, the legend provides that the first set of control information is represented by reference sign 10, a first indicator is represented by reference sign 12, a second indicator is represented by reference sign 14, a third indicator is represented by reference sign 16, a first control information is represented by reference sign 18, a second control information is represented by reference sign 20.

FIG. 3 shows that the first set of control information is transmitted periodically by the network node. The first set of control information may comprise Pilots (CSI-RS), and basic system information.

FIG. 3 shows that indicator 12 is associated with a content comprising the first set of control information and the first control information and that indicator 14 is associated with a content comprising the first set of control information and the first control information and the second control information. FIG. 3 shows that indicator 16 is associated with a content comprising the first set of control information and the second control information.

In one or more exemplary methods, the method 300 comprises waking up S307 a main receiver of the wireless electronic device based on processing of the indicator in a wake-up receiver of the wireless electronic device. For example, the wireless electronic device may be configured to wake up a main received based on receiving the indicator in the wake-up receiver part of the wireless electronic device.

This allows to save signaling resources in the wireless communications network. For example, a wireless electronic device listening for a certain information element would have no specific use of control signals with the first set of control information referred by 10 and is capable of identifying relevant control signals based on the indicator, such as 12, 14, 16. Other wireless electronic devices that aim at detecting the usage of the unlicensed band need to listen less frequently to the control signal.

Figure 4:
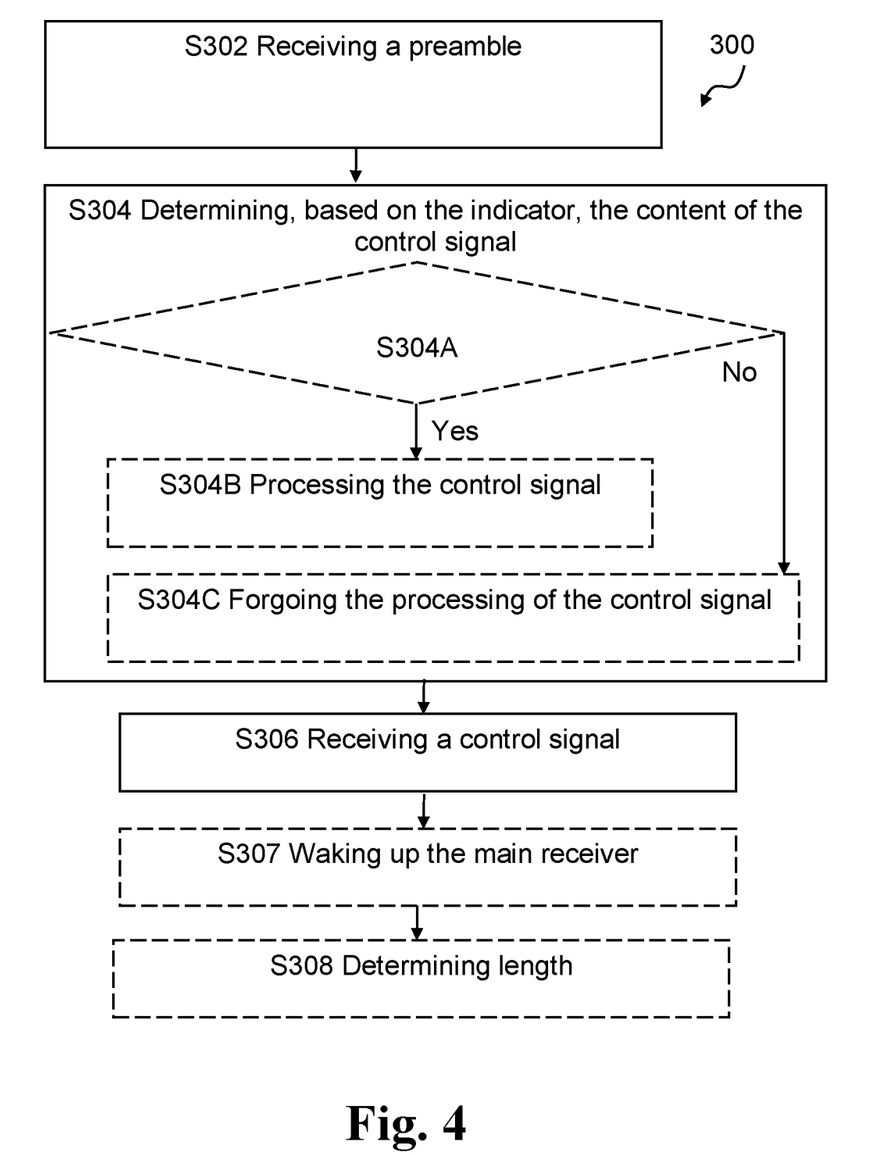
FIG. 4 is a flow diagram of an exemplary method, performed in a wireless electronic device according to the disclosure, and FIG. 5 schematically illustrates an exemplary wireless electronic device according to the disclosure.

FIG. 4 shows a flow diagram illustrating an exemplary method 300 performed in the wireless electronic device according to this disclosure. The method 300 is performed for discovery signalling in a wireless communications network.

The method 300 comprises receiving S302 a preamble to a control signal for discovery, e.g. from a network node, e.g. from a network node disclosed herein. The preamble comprises an indicator indicative of content of the control signal. The method 300 comprises determining S304, based on the indicator, the content of the control signal. The method 300 may comprise receiving S306 the control signal in the same transmission occasion as the preamble, e.g. from the network node.

In one or more exemplary methods, determining S304, based on the indicator, the content of the control signal for discovery comprises determining S304A whether the indicator indicates that the control signal comprises control information that is needed by the wireless electronic device.

In one or more exemplary methods, determining S304, based on the indicator, the content of the control signal for discovery comprises in accordance with a determination that the control signal comprises control information that is needed by the portable electronic device, processing S304B the control signal.

In one or more exemplary methods, determining S304, based on the indicator, the content of the control signal for discovery comprises in accordance with a determination that the control signal does not comprise control information that is needed by the portable electronic device, forgoing S304C the processing of the control signal.

In one or more exemplary methods, the method 300 comprises waking up S303 a main receiver of the wireless electronic device based on processing of the indicator in a wake-up receiver of the wireless electronic device. For example, the wireless electronic device may be configured to wake up a main received based on receiving the indicator in the wake-up receiver part of the wireless electronic device.

In one or more exemplary methods, the method 300 comprises determining S308 the length of the control signal based on the indicator.

In one or more exemplary methods, the method 300 comprises determining that an unlicensed band is used by a new radio, NR-enabled device based on the indicator.

Figure 5:
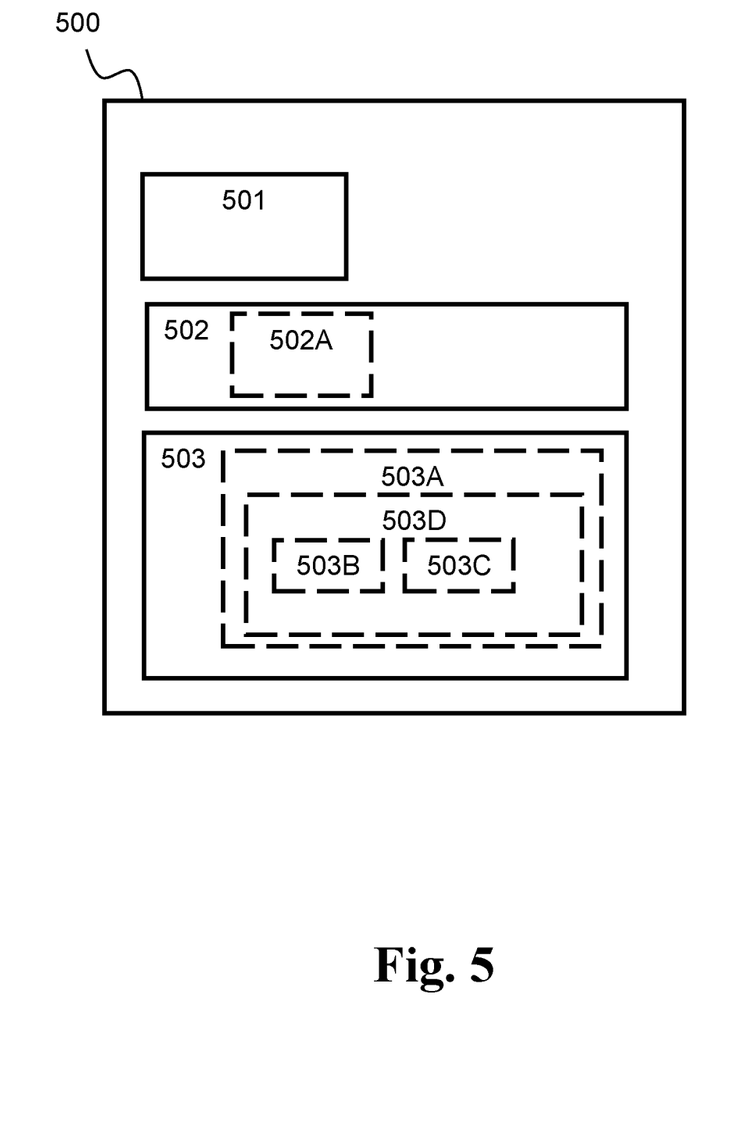

FIG. 5 shows a block diagram of an exemplary wireless electronic device 500 according to the disclosure.

The wireless electronic device 500 comprises a memory module 501, a processor module 502, and a wireless interface 503. The wireless electronic device 501 may be configured to perform any of the methods disclosed in FIG. 4.

The wireless electronic device 500 is configured to communicate with a network node, such as the network node disclosed herein, using a wireless communications network.

The wireless electronic device 500 is configured to receive, via the wireless interface 503, a preamble to a control signal for discovery. The preamble comprises an indicator indicative of content of the control signal.

The wireless electronic device 500 is configured to determine, via the processor module 502 (e.g. via a determiner module 502A), based on the indicator, the content of the control signal, optionally by performing any of the steps S304A, S304B, S304C of FIG. 4.

The wireless interface 503 may comprise a receiver module 503A comprising a wake up receiver 503D. The wake up receiver 503D may comprise an energy detector 503B with a correlator 503C for the indicator received to be processed accordingly. When processed according to this disclosure, the indicator advantageously provides a wake up signal when the wireless electronic device 500 listens only to the control signals for discovery. When processed according to this disclosure, the indicator advantageously provides an indicator of both the content and indicative of the length of the control signal.

The wireless electronic device 500 is configured to determine, e.g. using the determiner module 502A, that an unlicensed band is used by a NR-enabled device based on the indicator When processed according to this disclosure, the indicator advantageously provides an easily detectable signal indicating to the wireless electronic device 500 that the 3GPP-NR communication network uses the unlicensed band.

The processor module 502 is optionally configured to perform any of the operations disclosed in FIG. 4. The operations of the wireless electronic device 500 may be embodied in the form of executable logic routines (e.g., lines of code, software programs, etc.) that are stored on a non-transitory computer readable medium (e.g., the memory module 501) and are executed by the processor module 502).

While the described functions and operations may be implemented in software, such functionality may as well be carried out via dedicated hardware or firmware, or some combination of hardware, firmware and/or software.

The memory module 501 may be one or more of a buffer, a flash memory, a hard drive, a removable media, a volatile memory, a non-volatile memory, a random access memory (RAM), or other suitable device. In a typical arrangement, the memory module 501 may include a non-volatile memory for long term data storage and a volatile memory that functions as system memory for the processor module 502. The memory module 501 may exchange data with the processor module 502 over a data bus. Control lines and an address bus between the memory module 501 and the processor module 502 also may be present (not shown in FIG. 5). The memory module 501 is considered a non-transitory computer readable medium.

The memory module 501 may be configured to store a look-up table associating an indicator to corresponding control information types in a part of the memory module 501.

Embodiments of methods and products according to the disclosure are set out in the following items:

1. A method, performed at a network node of a wireless communications network, for discovery signalling, the method comprising:
   generating (S102) an indicator based on one or more control information to be transmitted in a control signal for discovery, and transmitting (S104) the indicator as a preamble to the control signal for discovery in a transmission occasion, wherein the indicator is indicative of content of the control signal.

2. The method according to item 1, wherein generating (S102) an indicator based on one or more control information comprises identifying (S102B) one or more control information types based on the control information to be transmitted in the control signal for discovery, and generating (S102C) the indicator based on the one or more control information types.

3. The method according to any of items 1-2, wherein the control signal for discovery comprises one or more individual signals.

4. The method according to any of items 2-3, wherein generating (S102) the indicator based on the one or more control information comprises selecting (S102D) the indicator, amongst a plurality of indicators, based on the one or more control information types.

5. The method according to any of items 1-4, wherein the indicator is indicative of a length of the control signal.

6. The method according to any of items 1-5, the method comprising applying (S106) a first modulation or coding scheme on the preamble and a second modulation or coding scheme on the control signal, wherein the second modulation or coding scheme is different from the first modulation or coding scheme.

7. The method according to item 5, wherein applying (S106) a first modulation or coding scheme on the preamble and a second modulation or coding scheme on the control signal comprises applying (S106A) an ON/OFF keying modulation scheme and coding scheme to the preamble.

8. The method according to any of the previous items, the method comprising: determining (S101) whether the one or more control information to be transmitted in the control signal is to include control information additional to a first set of control information, and in accordance with a determination that the one or more control information to be transmitted in the control signal is to include control information additional to the first set of control information, performing the generating (S102) and the transmitting (S104).

9. The method according to any of the previous items, the method comprising transmitting (S108) the control signal to a wireless electronic device by transmitting, in a single transmission occasion, a series of a plurality of individual signals forming the control signal.

10. A method, performed at a wireless electronic device, for discovery signalling in a wireless communications network, the method comprising:
receiving (S302) a preamble to a control signal for discovery, wherein the preamble comprises an indicator indicative of content of the control signal;
determining (S304), based on the indicator, the content of the control signal;
receiving (S306) the control signal in the same transmission occasion as the preamble.

11. The method according to item 10, wherein determining (S304), based on the indicator, the content of the control signal for discovery comprises determining (S304A) whether the indicator indicates that the control signal comprises control information in the body part that is needed by the wireless electronic device, and in accordance with a determination that the control signal comprises control information that is needed by the wireless electronic device, processing (S304B) the control information.

12. The method according to any of items 10-11, wherein determining S304, based on the indicator, the content of the control signal for discovery comprises: in accordance with a determination that the control signal does not comprise control information that is needed by the wireless electronic device, forgoing (S304C) the processing of the control information.

13. The method according to items 10-12, the method comprising waking up (S303) a main receiver of the wireless electronic device based on processing of the indicator in a wake-up receiver of the wireless electronic device.

14. The method according to items 10-13, the method comprising: determining the length of the control signal based on the indicator.

15. The method according to items 10-14, the method comprising determining that the unlicensed band is used by a new radio, NR-enabled device based on the indicator.

16. A network node (200) of a wireless communication network, the network node (200) comprising a memory module (201), a processor module (202), and a wireless interface (203), wherein the network node (200) is configured to perform a method according to any of items 1-9.

17. A wireless electronic device (500) comprising a memory module (501), a processor module (502), and a wireless interface (503), wherein the wireless electronic device (500) is configured to perform a method according to any of items 9-15.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed at a network node of a wireless communications network, for discovery signaling for operation in an unlicensed band, the method comprising:
   generating an indicator based on one or more control information to be transmitted in a control signal for discovery, wherein the indicator is indicative of content of the control signal;
   applying a first modulation or coding scheme on the indicator and applying a second modulation or coding scheme on the control signal, wherein the second modulation or coding scheme is different from the first modulation or coding scheme; and
   transmitting the indicator and the control signal for discovery in a transmission occasion,
   whereby an associated wireless electronic device of the wireless communications network may process the control information based on the indicator.

2. The method according to claim 1, wherein generating an indicator based on one or more control information comprises identifying one or more control information types based on the control information to be transmitted in the control signal for discovery, and generating the indicator based on the one or more control information types.

3. The method according to claim 1, wherein the control signal for discovery comprises one or more individual signals.

4. The method according to claim 1, wherein the generating the indicator comprises generating an indicator that is indicative of a length of the control signal.

5. The method according to claim 1, further comprising:
   determining whether the one or more control information to be transmitted in the control signal is to include control information additional to a first set of control information, and
   in accordance with a determination that the one or more control information to be transmitted in the control signal is to include control information additional to the first set of control information, generating the indicator and transmitting the indicator and the control signal.

6. The method according to claim 1, further comprising transmitting the control signal to an associated wireless electronic device by transmitting, in a single transmission occasion, a series of a plurality of individual signals forming the control signal.

7. The method according to claim 1, wherein the generating the indicator comprises generating an indicator that is indicative of the operation in the unlicensed band.

8. A method, performed at a wireless electronic device, for discovery signaling in a wireless communications network for operation in an unlicensed band, the method comprising:
   receiving an indicator and a control signal for discovery, wherein the indicator is indicative of content of the control signal, wherein the indicator comprises a first modulation or coding scheme, wherein the control signal comprises a second modulation or coding scheme different than the first modulation or coding scheme;
   receiving the control signal in the same transmission occasion as the indicator; and
   processing the control information based on the indicator.

9. The method according to claim 8, wherein the determining, based on the indicator, the content of the control signal for discovery comprises determining whether the indicator indicates that the control signal comprises control information in the body part that is needed by the wireless electronic device, and in accordance with a determination that the control signal comprises the control information that is needed by the wireless electronic device, processing the control information.

10. The method according to claim 9, wherein the determining, based on the indicator, the content of the control signal for discovery comprises:
    in accordance with a determination that the control signal does not comprise the control information that is needed by the wireless electronic device, forgoing the processing of the control information.

11. The method according to claim 8, further comprising waking up a main receiver of the wireless electronic device based on processing of the indicator in a wake-up receiver of the wireless electronic device.

12. The method according to claim 8, further comprising:
    determining a length of the control signal based on the indicator.

13. The method according to claim 8, further comprising determining that the unlicensed band is used by a new radio, NR-enabled device based on the indicator.

14. A network node of a wireless communication network, the network node comprising:
    a memory module storing instructions;
    a processor module; and
    a wireless interface,
    wherein the processor module is configured to execute the instructions perform discovery signaling for operation in an unlicensed band by:
        generating an indicator based on one or more control information to be transmitted in a control signal for discovery, wherein the indicator is indicative of content of the control signal;
        applying a first modulation or coding scheme on the indicator and applying a second modulation or coding scheme on the control signal, wherein the second modulation or coding scheme is different from the first modulation or coding scheme; and transmitting via the wireless interface the indicator and the control signal for discovery in a transmission occasion, whereby an associated wireless electronic device of the wireless communications network may process the control information based on the indicator.

15. A wireless electronic device comprising:
a memory module storing instructions;
a processor module; and
a wireless interface,
wherein the processor module is configured to execute the instructions to participate in operation in an unlicensed band by:
receiving an indicator and a control signal for discovery, wherein the indicator is indicative of content of the control signal, wherein the indicator comprises a first modulation or coding scheme, wherein the control signal comprises a second modulation or coding scheme different than the first modulation or coding scheme;
receiving the control signal in the same transmission occasion as the indicator; and processing the control information based on the indicator.

16. The wireless electronic device according to claim 15, wherein:
the processor module is configured to execute the instructions to:
determine, based on the indicator, whether the indicator indicates that the control signal comprises control information that is needed by the wireless electronic device; and
based on a result of determining whether the control signal comprises the control information that is needed by the wireless electronic device, selectively processing the control information.

17. The wireless electronic device according to claim 15, wherein:
the processor module is configured to execute the instructions to selectively wake up a main receiver of the wireless electronic device based on a processing of the indicator in a wake-up receiver of the wireless electronic device.

18. The wireless electronic device according to claim 15, wherein:
the processor module is configured to execute the instructions to determine a length of the control signal based on the indicator.

19. The wireless electronic device according to claim 15, wherein:
the processor module is configured to execute the instructions to determine based on the indicator that the unlicensed band is used by a new radio (NR) enabled device.

* * * * *